US012579817B2

(12) United States Patent (10) Patent No.: US 12,579,817 B2
Jo (45) Date of Patent: Mar. 17, 2026

(54) VEHICLE CONTROL DEVICE AND CONTROL METHOD THEREOF FOR CAMERA VIEW CONTROL BASED ON SURROUNDING ENVIRONMENT INFORMATION

(71) Applicants:Hyundai Motor Company, Seoul (KR); Kia Corporation, Seoul (KR)

(72) Inventor: Dong Cheol Jo, Cheonan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 325 days.

(21) Appl. No.: 18/337,243

(22) Filed: Jun. 19, 2023

(65) Prior Publication Data

US 2024/0071091 A1 Feb. 29, 2024

(30) Foreign Application Priority Data

Aug. 26, 2022 (KR) ........................ 10-2022-0107538

(51) Int. Cl.
| | |
|---|---|
| *G01S 17/50* | (2006.01) |
| *B60W 30/18* | (2012.01) |
| *B60W 40/105* | (2012.01) |
| *G06V 20/56* | (2022.01) |

(52) U.S. Cl.
CPC ....... *G06V 20/56* (2022.01); *B60W 30/18145* (2013.01); *B60W 40/105* (2013.01); *B60W 2420/403* (2013.01); *B60W 2420/408* (2024.01)

(58) Field of Classification Search
CPC ..... B60W 2420/403; B60W 2420/408; B60W 30/18145; B60W 40/105; G06V 20/56
USPC .......................................................... 382/104
See application file for complete search history.

(56) References Cited

U.S. PATENT DOCUMENTS

| | | | | |
|---|---|---|---|---|
| 2019/0204835 | A1* | 7/2019 | Cho | B60R 1/28 |
| 2020/0298842 | A1* | 9/2020 | Takamatsu | B60W 30/09 |
| 2023/0044279 | A1* | 2/2023 | Lu | G01S 17/86 |

FOREIGN PATENT DOCUMENTS

| | | | | |
|---|---|---|---|---|
| KR | 20110075291 A | 7/2011 | | |
| KR | 102356480 B1 | 1/2022 | | |
| KR | 102364038 B1 | 2/2022 | | |
| KR | 102371995 B1 * | 3/2022 | ............... | H04N 7/18 |

* cited by examiner

*Primary Examiner* — Chad Dickerson
(74) *Attorney, Agent, or Firm* — Slater Matsil, LLP

(57) ABSTRACT

An embodiment vehicle control device includes a LiDAR sensor mounted in a vehicle and configured to sense an environment surrounding the vehicle, an audio video navigation (AVN) unit mounted in the vehicle and configured to generate an event signal when a predetermined event area is sensed during driving of the vehicle, and a processor configured to acquire information on the environment surrounding the vehicle based on LiDAR data obtained by the LiDAR sensor and the event signal and to control a view angle of a camera mounted in the vehicle in response to the information on the environment.

20 Claims, 10 Drawing Sheets

VEHICLE CONTROL DEVICE AND CONTROL METHOD THEREOF FOR CAMERA VIEW CONTROL BASED ON SURROUNDING ENVIRONMENT INFORMATION

CROSS-REFERENCE TO RELATED APPLICATIONS

This application claims the benefit of Korean Patent Application No. 10-2022-0107538, filed on Aug. 26, 2022, which application is hereby incorporated herein by reference.

TECHNICAL FIELD

The present disclosure relates to a vehicle control device and a control method thereof.

BACKGROUND

Recently, the implementation of side mirror cameras has been in full swing, showing side or rear images to driver's by using cameras, and LiDARs are also expected to be introduced into mass-produced vehicles in the future.

In prior side mirror devices, a considerable number of blind spots have occurred according to a position of a driver and a mirror angle.

Since the angle of the side mirror of the vehicle is fixed in the driving mode/parking mode, it is difficult to check the vehicle with the side mirror from the corner while driving, causing a blind spot.

That is, in the case where the prior art mirror type side mirror induces a fixed angle, there is a limitation in adjusting the angle, and thus, the state of the vehicle or its surroundings is not properly recognized.

When a driver turns a corner while only relying on a side mirror in a state where the state of the vehicle or its surroundings is not properly recognized, there is a problem in that a blind spot occurs thus increasing risk of an accident.

SUMMARY

The present disclosure relates to a vehicle control device and a control method thereof. Particular embodiments relate to a vehicle control device and a control method thereof capable of controlling at least one camera by using LiDAR sensor information mounted in a vehicle and showing a preset blind spot area of the vehicle to a user.

An embodiment provides a vehicle control device and method capable of allowing a user to safely drive a vehicle by controlling an operation of at least one camera mounted in the vehicle using a LiDAR sensor having stable tracking performance.

According to an embodiment of the present disclosure, the vehicle control device comprises a LiDAR sensor mounted on a vehicle to generate LiDAR data for sensing an environment surrounding the vehicle, an audio video navigation (AVN) unit mounted on the vehicle to generate an event signal when a predetermined event area is sensed during the driving of the vehicle, and a processor to acquire the information on the environment surrounding the vehicle based on the LiDAR data and the event signal and to control a view angle of a camera mounted on the vehicle in response to the acquired information.

In at least one embodiment of the present disclosure, the camera is configured to provide to the AVN unit blind spot (BS) image data photographed while rotating under the control of the processor.

In at least one embodiment of the present disclosure, the vehicle control device further comprises an internal display unit configured to display the BS image data provided from the camera.

In at least one embodiment of the present disclosure, the AVN unit comprises a display unit configured to display the BS image data provided from the camera.

In at least one embodiment of the present disclosure, the processor comprises a first controller comprising at least one algorithm to obtain the information on the environment surrounding the vehicle based on the LiDAR data and the event signal and a second controller electrically connected to the camera and configured to receive a first rotation angle control signal or a second rotation angle control signal from the first controller and to adjust the view angle of the camera based on the first rotation angle control signal or the second rotation angle control signal.

In at least one embodiment of the present disclosure, the first controller is configured to calculate initial information of the vehicle using the at least one algorithm and to acquire the information on the environment surrounding the vehicle by collecting vehicle speed information of the vehicle from the initial information of the vehicle.

In at least one embodiment of the present disclosure, the processor is configured to acquire a data set by using the LiDAR data and to generate an event flag by using the data set.

In at least one embodiment of the present disclosure, the event area includes a first area which is an entry area of the event area and a second area which is an exit area of the event area.

In at least one embodiment of the present disclosure, the first controller is configured to adjust the event area based on a result from analyzing a location condition of the vehicle located in the event area and a speed of the vehicle.

In at least one embodiment of the present disclosure, the first controller is configured to maintain the event area when the speed of the vehicle is within a predetermined cornering speed and the location condition is satisfied and to adjust the event area when the speed of the vehicle is equal to or greater than the predetermined cornering speed and the location condition is satisfied.

According to an embodiment of the present disclosure, a vehicle control method includes sensing an environment surrounding a vehicle by using a LiDAR sensor mounted in the vehicle, generating an event signal when a predetermined event area is sensed during the driving of the vehicle, acquiring the information on the environment surrounding the vehicle based on the event signal and LiDAR data sensed by the LiDAR sensor under the control of a processor mounted in the vehicle, and controlling a view angle of a camera mounted in the vehicle in response to the information on the environment.

In at least one embodiment of the method of the present disclosure, the acquiring of the information on the environment surrounding the vehicle includes capturing blind spot (BS) image data by the camera being rotated under control of the processor and outputting the captured BS image data.

In at least one embodiment of the method of the present disclosure, the acquiring of the information on the environment surrounding the vehicle includes displaying the BS image data.

In at least one embodiment of the method of the present disclosure, the processor comprises a first controller and a second controller, wherein the acquiring of the information on the environment surrounding the vehicle includes acquiring the information on the environment surrounding the vehicle based on the LiDAR data and the event signal under control of the first controller.

In at least one embodiment of the method of the present disclosure, the controlling of the view angle of the camera includes receiving a first rotation angle control signal or a second rotation angle control signal from the first controller under the control of the second controller and adjusting the view angle of the camera based on the first rotation angle control signal or the second rotation angle control signal.

In at least one embodiment of the method of the present disclosure, the acquiring of the information on the environment surrounding the vehicle includes calculating initial information of the vehicle under the control of the first controller and acquiring the information on the environment by collecting vehicle speed information of the vehicle in the initial information of the vehicle.

In at least one embodiment of the method of the present disclosure, the generating of the event signal includes acquiring a data set by using the LiDAR data under the control of the processor and generating an event flag by using the data set.

In at least one embodiment of the method of the present disclosure, the event area includes a first area which is an entry area of the event area and a second area which is an exit area of the event area.

In at least one embodiment of the method of the present disclosure, the acquiring of the information on the environment surrounding the vehicle includes adjusting the event area based on a result from analyzing a location condition of the vehicle located in the event area and a speed of the vehicle under the control of the first controller.

In at least one embodiment of the method of the present disclosure, the adjusting of the event area includes maintaining the event area when the speed of the vehicle is within a predetermined cornering speed and the location condition is satisfied and adjusting the event area when the speed of the vehicle is equal to or greater than the predetermined cornering speed and the location condition is satisfied.

According to an embodiment, the vehicle control device obtains surrounding information and vehicle speed information of a vehicle by using a LiDAR sensor with respect to a blind spot area of the vehicle created in a specific environment condition or a location of a specific pattern, calculates a view angle of a camera based on the obtained surrounding information and vehicle speed information of the vehicle, and adjusts the view angle of the camera up, down, left, and right in response to the calculated view angle of the camera, thereby providing an image of the blind spot area of the vehicle to a driver and improving the driving safety.

The vehicle control device according to an embodiment may detect other vehicles surrounding the vehicle by the LiDAR sensor, but also it may prevent driving or safety accidents occurring in blind spot areas by showing the area through an AVN unit, an internal display unit, or the direct side mirror that may be undetectable due to the structure or height of a corner or angle.

The following identifiers may be referenced in connection with the figures to describe embodiments of the present disclosure.

110: LiDAR sensor
130: AVN unit
150: Processor
151: First controller
152: Second controller
170: Camera
190: Internal display unit

DETAILED DESCRIPTION OF ILLUSTRATIVE EMBODIMENTS

Hereinafter, embodiments will be described in order to specifically describe features of the present disclosure, and embodiments of the present disclosure will be described in detail with reference to the accompanying drawings in order to help comprehension of the present disclosure. However, the embodiments according to the present disclosure may be modified in various forms, and the scope of the present disclosure should not be construed as being limited to the embodiments described below. The embodiments of the present disclosure are provided to completely describe the present disclosure more than the person having ordinary knowledge in the art.

In the description of the present embodiments, when each element is referred to as being formed "on or under," the on or under includes both elements are in direct contact with each other or that one or more other elements are disposed (indirectly) between the two elements.

In addition, when expressed as "on" or "under," the meaning of the upper direction and the lower direction based on one element may be included.

Further, the pertaining terms such as "first", "second", "on", and "under" used below may be used to distinguish one entity or element from another entity or element without necessarily requiring or implying any physical or logical relationship or sequence between such entities or elements.

Hereinafter, a vehicle control device using a light detection and ranging (LiDAR) sensor, a method thereof, and a vehicle using the same according to embodiments will be described with reference to the accompanying drawings.

For convenience, the vehicle control device using the LiDAR sensor and the method thereof will be described applying the Cartesian coordinate system (x-axis, y-axis, and z-axis), but the vehicle control device using the LiDAR sensor and the method thereof may be described by other coordinate systems. In addition, according to the Cartesian coordinate system, the x-axis, the y-axis, and the z-axis are orthogonal to each other, but embodiments are not limited thereto. That is, the x-axis, the y-axis, and the z-axis may intersect each other.

Figure 1:
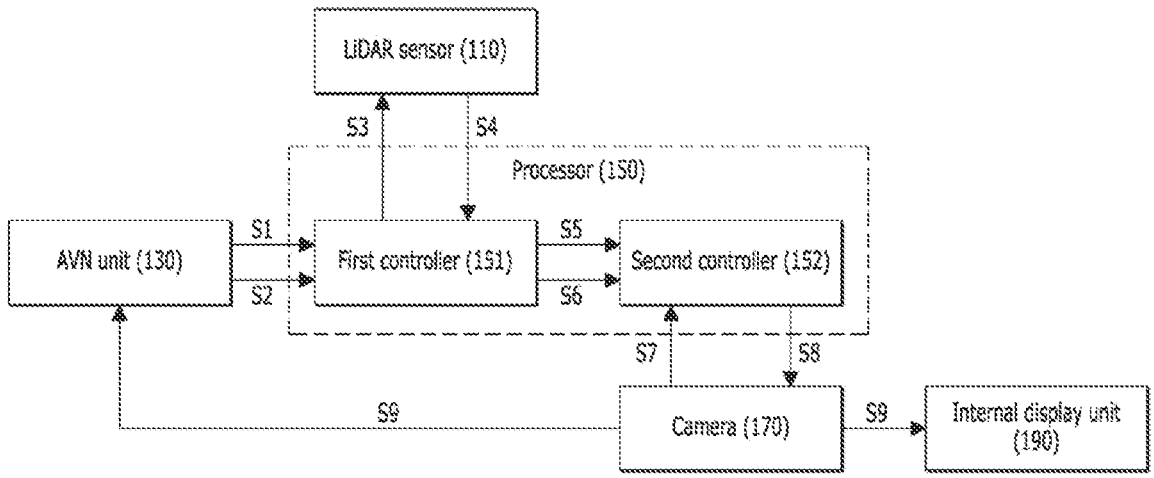
FIG. 1 is a diagram illustrating a vehicle control device according to an embodiment of the present disclosure.

FIG. 1 is a diagram for describing a vehicle control device according to an embodiment of the present disclosure.

Referring to FIG. 1, the vehicle control device according to an embodiment of the present disclosure may include a LiDAR sensor no, an AVN unit 130, and a processor 150.

The LiDAR sensor no may be mounted on the vehicle to generate LiDAR data for sensing the surroundings of the vehicle.

The LiDAR sensor no may sense LiDAR data, which is information on an object, by emitting a laser pulse having a prescribed wavelength to the object and then measuring a time when the laser pulse was reflected and returned from the object within a measurement range. For example, the LiDAR sensor no may emit a single, circular laser pulse having a wavelength of 905 nm to 1550 nm to the object, and then measure a time when the laser pulse was reflected and returned from the object within the measurement range, thereby sensing LiDAR data as information about the object, such as a distance from the LiDAR sensor no to the object, a direction of the object, a speed of the object, a temperature, a material distribution, and a characteristic value of concentration.

Here, the object may be another vehicle, a person, an object, or the like which exists outside the vehicle in which the LiDAR sensor no is mounted, but the embodiment is not limited to a specific type of the object.

The LiDAR sensor no may include a transmitter (not shown) for transmitting a laser pulse and a receiver (not shown) for receiving a laser pulse reflected and returned from the surface of an object existing within a sensor range. The receiver may have a field of view (FOV), which is an area that the LiDAR sensor no can observe at once without movement or rotation.

Since the LiDAR sensor no has higher detection accuracy for the longitudinal/transverse direction than a radio detecting and ranging (radar) sensor, it can provide accurate longitudinal/transverse position information, and thus can be easily used for obstacle detection, vehicle location recognition, and the like.

The LiDAR sensor no may include a first LiDAR sensor and a second LiDAR sensor. For example, the first LiDAR sensor may be referred to as a two-dimensional (2D) LiDAR sensor, and the second LiDAR sensor may be referred to as a three-dimensional (3D) LiDAR sensor.

The 2D LiDAR sensor may be configured to be tilted or rotated and may be used to secure LiDAR data including 3D information by being tilted or rotated.

The 3D LiDAR sensor may obtain a plurality of 3D points, and thus may predict even height information of an obstacle, thereby helping accurate and detailed object detection or tracking. In the 3D LiDAR sensor, the 2D LiDAR sensor may include a plurality of layers and generate a LiDAR data including 3D information. The LiDAR data may be referred to as LiDAR data.

The LiDAR sensor 110 may output point cloud data consisting of a plurality of dots (points) with respect to a single object. That is, the point cloud data may be in the form of data in which LiDAR is provided.

When the radar or ultrasonic sensor may obtain the object or the point reflected from the object as the data, the LiDAR sensor 110 may provide the LiDAR data as data including the three-dimensional coordinates calculated through various pre-processing operations from a large quantity of information and the intensity that is the intensity of the signal.

The vehicle control device according to an embodiment is not limited to a specific shape, position, and type of the LiDAR sensor no.

The audio video navigation (AVN) unit 130 may be mounted in a vehicle and may generate an event signal when a predetermined event area is detected while the vehicle is being driven. Although not shown, the AVN unit 130 may include a communication unit, a memory, a sound output unit, a display unit, an interface unit, and an AVN controller.

The communication unit (not shown) may include one or more modules that enable wireless communication between a vehicle in which the AVN unit 130 is installed, between the AVN unit 130 and a mobile communication system, between the AVN unit 130 and an external terminal, or between the AVN unit 130 and a network in which the external terminal is located. For example, the communication unit may include at least one of a Bluetooth module, a Wi-Fi module, a mobile communication module, a broadcast reception module, and a global positioning system (GPS) module. For example, the communication unit may transmit and receive a wireless signal to and from at least one of a base station, an external terminal, and a server on a mobile communication network constructed according to global system for mobile communication (GSM), code division multi access (CDMA), wideband CDMA (WCDMA), high speed downlink packet access (HSDPA), long term evolution (LTE), 5G, and the like. The communication unit may acquire the location of the AVN device using a signal transmitted from a GPS satellite.

The memory (not shown) may store a program for operating the AVN controller and may also store data input/output in relation to the vehicle. For example, the memory may include at least one storage medium among a flash memory type, a hard disk type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The sound output unit (not shown) may output audio data received from the outside or stored in a memory in a call mode, a recording mode, a voice recognition mode, a media output mode (i.e., broadcasting, music, moving images, radio, etc.), and the like. The sound output unit may include a speaker, a buzzer, a horn of a vehicle (klaxon, horn), and the like.

The display unit (not shown) may display various road guide information, point of interest information, map information, and various vehicle information (i.e., a speed, a gear stage, a remaining amount of fuel, a fuel efficiency, a tire air pressure, etc.) received from the vehicle, which are performed by the AVN unit 130, and may display a map of a current area, a position of the vehicle, road guide information to a destination, and the like pertaining to navigation.

The display unit may be formed in the form of a touch screen including a touch sensor to sense a touch made on the touch screen from a user. The touch sensor may sense a touch (or a touch input) applied to the touch screen using at least one of various touch methods such as a resistive method, a capacitive method, an infrared method, an ultrasonic method, a magnetic field method, and the like.

The interface unit (not shown) serves as a passage connected to the vehicle and may receive vehicle-related data or power from the vehicle under the control of the AVN controller to transfer the received data or power to each component in the AVN unit 13o. For example, the interface unit may include an external charger port, a wired/wireless data port, a memory card port, an audio input/output (I/O) port, a video input/output (I/O) port, an earphone port, etc.

The AVN controller may control the overall operation of the AVN unit 13*o*. The AVN controller may be electrically connected to the communication unit, the memory, the sound output unit, the display unit, and the interface unit and may control operations thereof.

The processor 150 may acquire surrounding information of the vehicle based on the LiDAR data and the event signal and control the view angle of a camera 170 mounted on the vehicle in response to the acquired information on a surrounding of the vehicle.

Here, the information on the surrounding of the vehicle may include position information on a current position of the vehicle, vehicle speed information on a current speed of the vehicle, left and right road boundary lines, first surrounding vehicle information on another vehicle which is driving in the left and right lanes, second surrounding vehicle information on another vehicle which is driving in the front or rear direction, rotation radius information on a rotation radius range of the vehicle, and the like. Embodiments of the present disclosure are not limited thereto, and various pieces of information on the surrounding of the vehicle may be acquired based on various signals or data provided from at least one component or sensor installed in the vehicle.

The processor 150 may acquire the DATA SET by using the LiDAR data provided from the LiDAR sensor no and may perform image processing by using the acquired DATA SET. That is, the processor 150 may acquire the DATA SET through the LiDAR data provided from the LiDAR or LiDAR sensor no and generate the event flag by using the acquired DATA SET, thereby being utilized for control of the vehicle. Here, the LiDAR data may include three-dimensional coordinates, the location of the vehicle, intensity information, and the like.

The processor 150 may obtain a desired DATA SET through optimization of a tuning value, pattern learning, function processing, and the like by using 3D coordinates, which are LiDAR data, the position of the vehicle, intensity information, and the like, and generate an event flag by using the desired DATA SET, thereby being utilized for vehicle control.

The above-described processor 150 may include a first controller 151 and a second controller 152.

The first controller 151 may be electrically connected to the AVN unit 130 to receive the event signal S1 or the vehicle speed information S2 from the AVN unit 130. The first controller 151 may be referred to as a LiDAR controller. The event signal S1 may be referred to as event information. The event signal S1 may include information on a predetermined event area, information on a corner mode entry flag, and the like. The vehicle speed information S2 may include an average speed of the vehicle which is being driven, a current speed of the vehicle, or the like.

The first controller 151 may be electrically connected to the at least one LiDAR sensor 110 to provide a LiDAR control signal S3 capable of controlling them or may receive LiDAR data S4 from the at least one LiDAR sensor no. Here, the LiDAR control signal S3 may control the overall operation of each of a plurality of LiDAR sensors no. Since the LiDAR data S4 has been sufficiently described above, a description thereof will be omitted.

The first controller 151 may include at least one algorithm. The first controller 151 may apply the LiDAR data S4 and the event signal S1 to at least one algorithm to obtain the information on the surrounding of the vehicle. For example, the first controller 151 may calculate initial information of the vehicle by using at least one algorithm and may obtain the information on the surrounding of the vehicle by collecting and correcting the vehicle speed information S3 in the calculated initial information of the vehicle.

The first controller 151 may analyze the acquired information on the surrounding of the vehicle, set a normal mode flag or a rotation mode flag based on the analyzed result value, and generate signals S5 and S6 corresponding to the set mode flag. For example, when the normal mode flag is set, the first controller 151 may generate the first rotation angle control signal S5 capable of fixing or maintaining the angle of the camera 170. On the other hand, when the rotation mode flag is set, the first controller 151 may generate the second rotation angle control signal S6 capable of controlling the view angle of the camera 170 by rotating the angle of the camera 170 up, down, left, and right.

The second controller 152 may be electrically connected to a plurality of cameras 170 to control the overall rotation operation of each camera 170. The second controller 152 may receive the first rotation angle control signal S5 or the second rotation angle control signal S6 from the first controller 151 and adjust the view angle of the camera 170 based on the received signal. The second controller 152 may be referred to as a side mirror controller or a camera controller.

For example, the second controller 152 may receive the position information S7 of the camera 170 from each of the plurality of cameras 170 and may extract the camera 170 that captures the surrounding space of the vehicle associated with the event area. The second controller 152 may generate an adjustment signal S8 capable of adjusting the view angle of the camera 170 according to the movement of the vehicle based on the first rotation angle control signal S5, the second rotation angle control signal S6, and the position information S7 of the camera 170.

The second controller 152 may provide the generated adjustment signal S8 to the at least one extracted camera 170, thereby quickly and accurately adjusting the view angle of the camera 170. The processor 150 described above is not limited thereto, and will be described in detail with reference to FIGS. 2 to 6 to be described later.

A minimum of one camera 170 may be installed in the interior of the vehicle to photograph at least one space of the front, rear, and interior of the vehicle to generate image information. The camera 170 may be embedded in the AVN unit 130 or a camera of a black box installed in a vehicle may be utilized.

Embodiments of the present disclosure are not limited thereto, and a minimum of one camera 170 may be installed in the side mirror or around the side mirror to photograph the surrounding space of the vehicle to generate image information. For example, the cameras 170 installed in the side mirrors of the vehicle may be referred to as an around view camera, a side mirror camera, or an external camera.

For example, the camera 170 may include a first side mirror camera and a second side mirror camera. The first side mirror camera may be embedded in the left side mirror or may be disposed around the left side mirror to photograph the left peripheral space of the vehicle. The second side mirror camera may be embedded in the right side mirror or may be disposed around the right side mirror to photograph the right peripheral space of the vehicle.

The above-described camera 170 may provide a blind spot (BS) image data (S9), which is captured while operating in response to a control signal under the control of the processor 150, to the AVN unit 130 or the internal display unit 190. For example, the camera 170 may rotate up, down, left, and right in response to the adjustment signal S8 provided from the processor iso. The camera 170 may adjust a view angle of the camera 170 while performing a rotation operation, and may generate blind spot (BS) image data (S9) by capturing an image at the adjusted view angle of the camera 170. The camera 170 may provide the generated BS image data (S9) to the AVN unit 130 or an internal display unit 190 in real time.

In addition, embodiments of the present disclosure are not limited thereto, and when an event area to be described later overlaps a child protection area, the camera 170 may photograph a wider blind spot area by converting a wide-angle mode and photographing under the control of the processor 150.

The internal display unit 190 may display the BS image data S9 provided from the camera 170. The internal display unit 190 may be installed inside the vehicle.

For example, the internal display unit 190 may include a first internal display and a second internal display. The first internal display may be electrically connected to the first side mirror camera 170 disposed in the vicinity of the left side mirror to display an image of the left side space of the vehicle photographed by the first side mirror camera in real time.

The second internal display may be electrically connected to a second side mirror camera disposed in the vicinity of the right side mirror and may display an image of a space around the right side of the vehicle photographed by the second side mirror camera 170 in real time.

Also, the first internal display or the second internal display may display an image with a different size according to an operation of the steering wheel. For example, when the steering wheel rotates in the counterclockwise direction, the image displayed on the first internal display may be enlarged to be larger than the image displayed on the second internal display and displayed. Contrarily, when the steering wheel rotates in the clockwise direction, the image displayed on the second internal display may be enlarged to be larger than the image displayed on the first internal display and displayed. Accordingly, the driver may view the image enlarged according to the direction of the steering wheel, thereby preventing driving or driving accidents occurring in the blind spot of the vehicle.

As described above, the vehicle control device according to an embodiment of the present disclosure may obtain the peripheral information and the vehicle speed information of the vehicle by using the LiDAR information sensed by the LiDAR sensor no with respect to the blind spot area generated in the specific peripheral condition or the position of the specific pattern, calculate the view angle of the camera 170 according to the obtained peripheral information and the vehicle speed information of the vehicle, and adjust the view angle of the camera 170 in the vertical and horizontal directions, thereby providing the driver with an image of the blind spot area and increasing the possibility of safe driving.

The vehicle control device of embodiments of the present disclosure may allow the LiDAR sensor no to detect another vehicle around the vehicle, but it may prevent driving or driving accidents occurring in the blind spot by showing the blind spot area, which may not be detected depending on the structure, height, or angle of the corner, as the AVN unit 130, the internal display unit 190, or a direct side mirror.

A method of controlling the vehicle control device according to an embodiment of the present disclosure described above so far is as follows.

Figure 2:
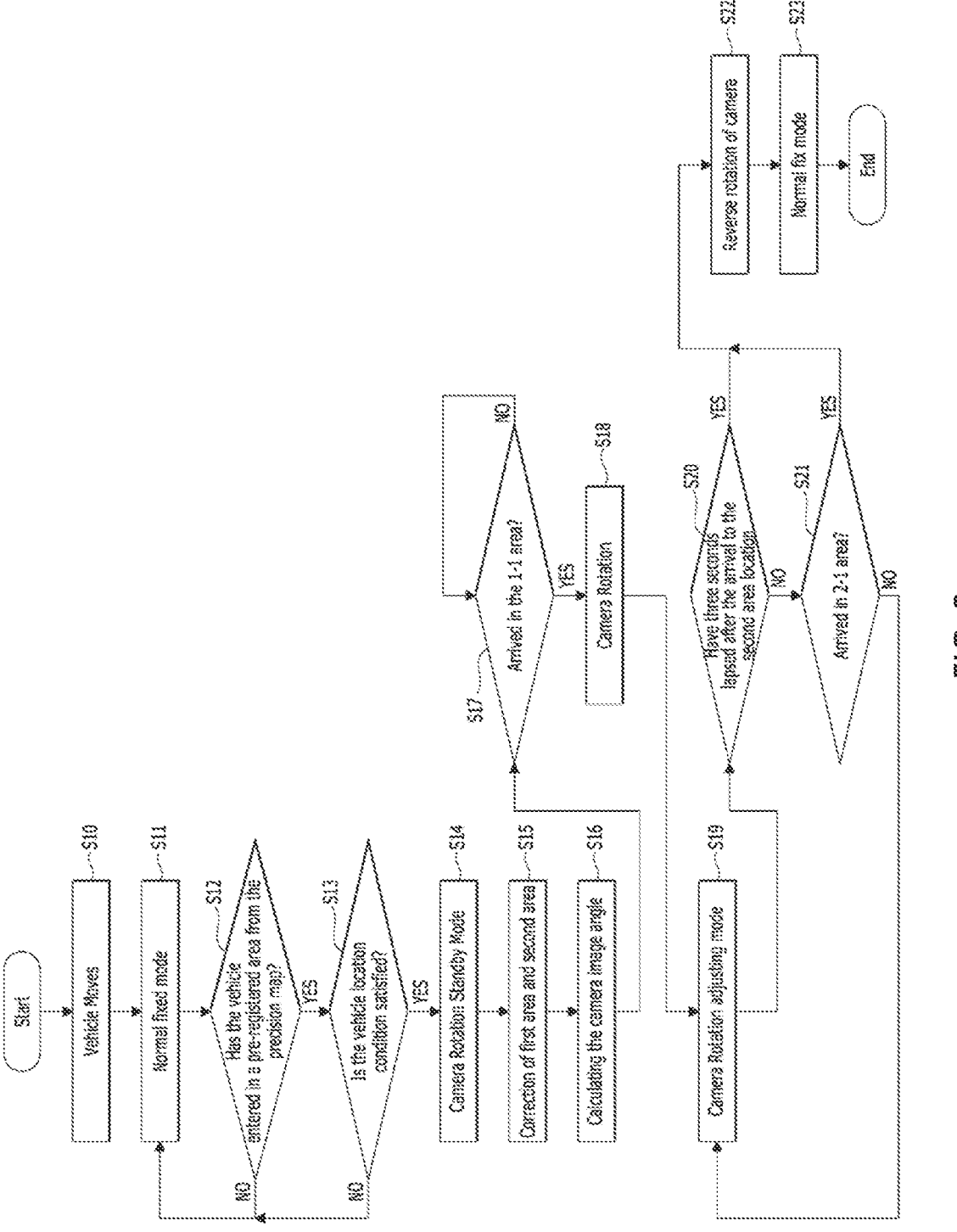
FIG. 2 is a diagram illustrating a vehicle control method according to an embodiment of the present disclosure.

FIG. 2 is a diagram illustrating a vehicle control method according to an embodiment of the present disclosure. FIGS. 3 to 6 are diagrams showing a vehicle control method according to an embodiment of the present disclosure.

Referring to FIGS. 2 to 6, the vehicle control method of embodiments of the present disclosure is as follows.

First, the vehicle may move (S10). The vehicle may be driving toward a place, which is a predetermined destination. The processor 150 may set the vehicle driving mode when the vehicle is driving.

In the vehicle driving mode, the processor 150 may set the side mirror camera 170 to a normal fixed mode (Sn). The normal fixed mode may be a mode in which the side mirror camera is fixed to a normal fixed view under the control of the processor 150.

Figure 3:
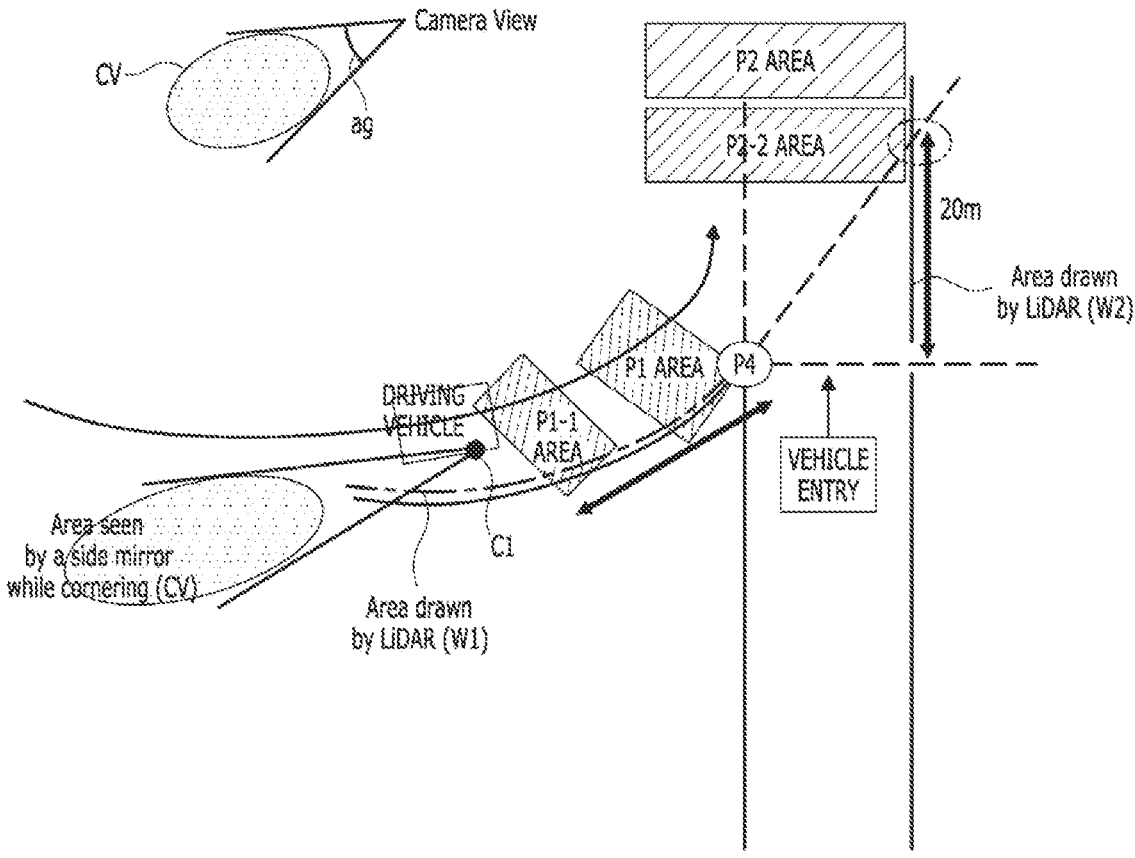
FIGS. 3 to 6 are diagrams illustrating a vehicle control method according to an embodiment of the present disclosure.
Figure 4:
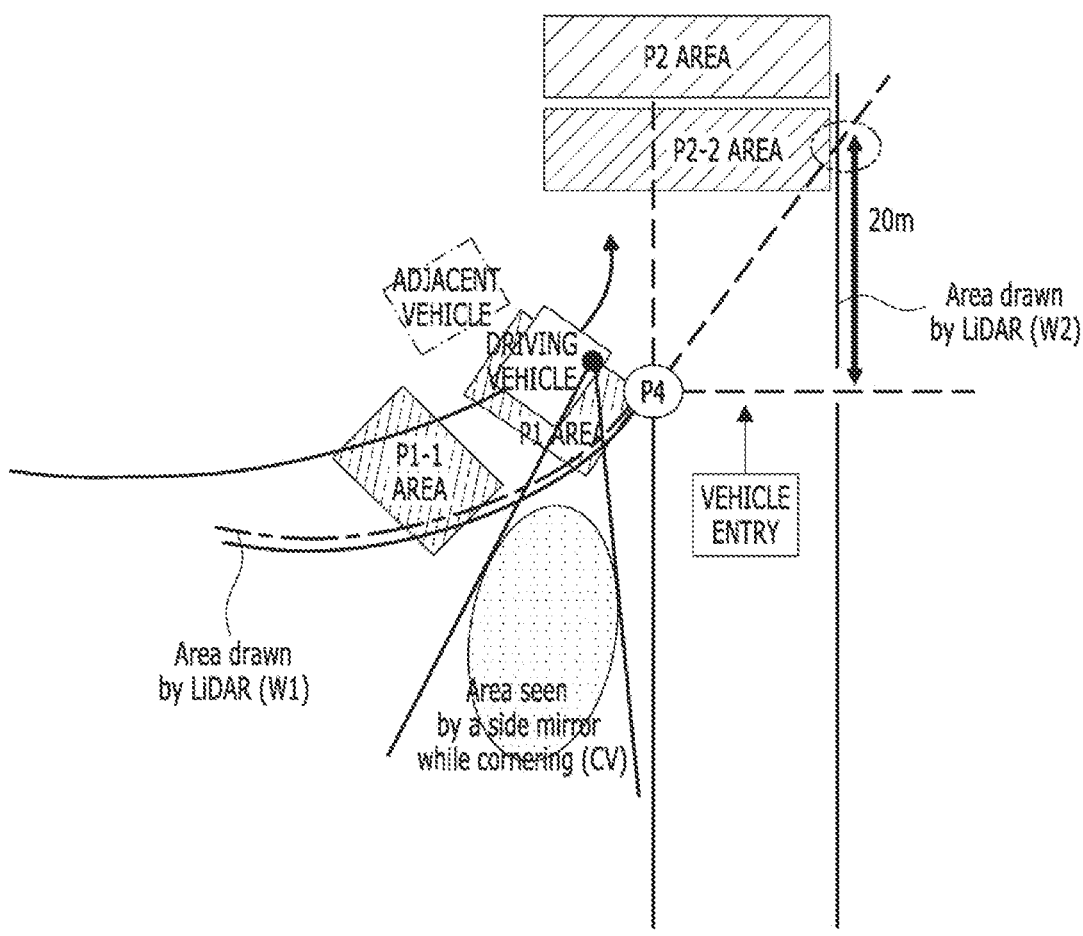

As illustrated in FIGS. 3 and 4, in the normal fixed mode, the side mirror camera may maintain the fixed angle (ag) and may capture the certain area CV based on the maintained fixed angle (ag). The captured certain area CV may be substantially the same during straight-line driving or corner driving.

When the vehicle is driving, the AVN unit 130 may detect an event area in real time. The LiDAR sensor no may sense the surroundings of the vehicle in real time.

The AVN unit 130 may determine whether to enter an event area pre-registered in the precise map or the navigation map (S12). For example, when the event area entry flag is sensed, the AVN unit 130 may determine that the event area has entered the pre-registered event area and generate the event signal. The AVN unit 130 may provide the generated event signal and vehicle speed information to the LiDAR controller.

The event area may be defined as a terrain or an area in which a blind spot of the driver, such as a corner entrance and an exit, is generated, and thus an image of the blind spot area of the vehicle is required to be checked through rotation of the camera 170. The event area may be referred to as a blind spot area. The event area may include a first area and a second area. A detailed description thereof will be described later.

The event area may be stored in a navigation map of the AVN unit 130. The event area may be previously set and stored in a precise map or a navigation map. For example, the AVN unit 130 may set a corner, which is connected to another lane at a corner exit under the control of the LiDAR controller and has a risk of an accident, as an event area, and may pre-register the set event area based on a precise map or a navigation map. Accordingly, the AVN unit 130 may be connected to another lane at a corner exit to provide an event signal to the LiDAR controller when entering an event area which is a corner where there is a risk of an accident.

The LiDAR controller may analyze a corner and a cornering speed at which a pre-corner exit event, which is an event area, is required based on the navigation map or the precision map and may determine whether the vehicle location condition is satisfied according to the analyzed result value.

For example, the LiDAR controller may identify the left and right road boundary lines based on the LiDAR data and may set a location where there is a possibility of an accident at the exit as the event location or the event area through the identification of the vehicle location within the vehicle. In the case of a road, the event area may be set to a right end point or a left end point as P4 and may be set to a predetermined area based on the setting of P4. Accordingly, P4 may be a corner exit end portion of the event area.

The predetermined area may be set to a rectangle (2.5 m×1 m). The event area may include a first area and a second area. For example, the first area may be referred to as a P1 point cloud area.

As described above, the LiDAR controller may set the corner exit end portion of the first area P1 identified through the LiDAR sensor to P4.

The LiDAR controller may set an initial value of a position where an approximate corner exit event is required as a first area P1 and an event completion position as a second area P2.

The LiDAR controller may receive the LiDAR data from the LiDAR sensor no and acquire an image of the position of the vehicle and the surrounding terrain of the vehicle based on the LiDAR data.

The first area may be referred to as a P1 area, and the second area may be referred to as a P2 area. For example, the first area may be an entry corner and the second area may be an exit corner. Embodiments of the present disclosure are not limited thereto, and the sizes of the first area and the second area may be changed in consideration of the size of the vehicle, vehicle speed information, and the like.

The LiDAR controller may determine whether the vehicle location condition is satisfied by recognizing the first area, which is the exit location, in real time through the LiDAR data (S13). The LiDAR controller can correct the exit location in real time through the point cloud of the LiDAR. That is, even if there is a precise map or a navigation map, an error may occur according to the GPS position of the vehicle, and thus the LiDAR controller may correct the exit position in real time through the point cloud of the LiDAR in consideration of the error.

The LiDAR controller may determine that the vehicle location condition is satisfied when the analyzed result value is a corner where a pre-corner exit event that is an event area is required and the vehicle speed is less than a predetermined corner speed and may fix the first area and the second area that are event areas without correcting them.

The predetermined corner speed may be less than 40 km, but is not limited thereto, and may be set to a range of 30 km to 60 km in consideration of a road traffic situation, a surrounding road environment, or the like.

Thereafter, as illustrated in FIG. 4, the LiDAR controller may set the camera 170 to a rotation standby state while entering the first area (S14).

Thereafter, the LiDAR controller may correct the previously registered event area in consideration of the LiDAR data and vehicle speed information, which are information of the LiDAR sensor 110 (Sib).

On the other hand, the LiDAR controller may determine that the vehicle location condition is not satisfied when the analyzed result value is a corner requiring a pre-corner exit event that is an event area and the vehicle speed is equal to or higher than a predetermined corner speed and may correct the first area and the second area that are event areas.

The event area may include a 1-1 area which is a correction area obtained by correcting the first area and a 2-2 area which is a correction area obtained by correcting the second area. That is, the event area may correct the first area to the 1-1 area and the second area to the 2-1 area. The area 1-1 may be referred to as a P1-1 area, and the area 2-2 may be referred to as a P2-2 area. A detailed description thereof will be described later.

Figure 5:
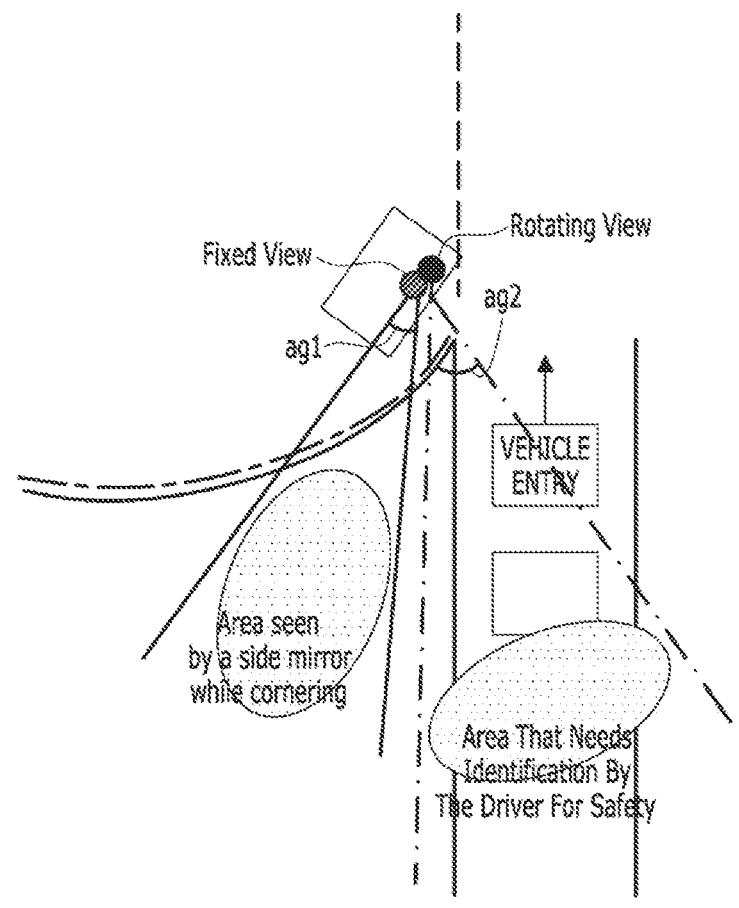

As shown in FIG. 5, the LiDAR controller may calculate the image angle of the camera 170 required for the driver using the LiDAR data that is the information of the LiDAR sensor 110 (S16).

The LiDAR controller may provide a control signal to the camera controller when entering the corrected 1-1 area (S17). The camera controller may adjust the view angle of the camera 170 based on the calculated image angle of the camera 170 (S18). For example, the camera controller may adjust the fixed view angle (ag1) of the camera 170 to the rotation view angle (age) of the camera 170.

The camera controller may set the camera 170 to the rotation adjustment mode (S19) and may continuously adjust the image angle of the camera 170 based on a control signal provided in real time from the LiDAR controller. A detailed description thereof will be described later.

Figure 6:
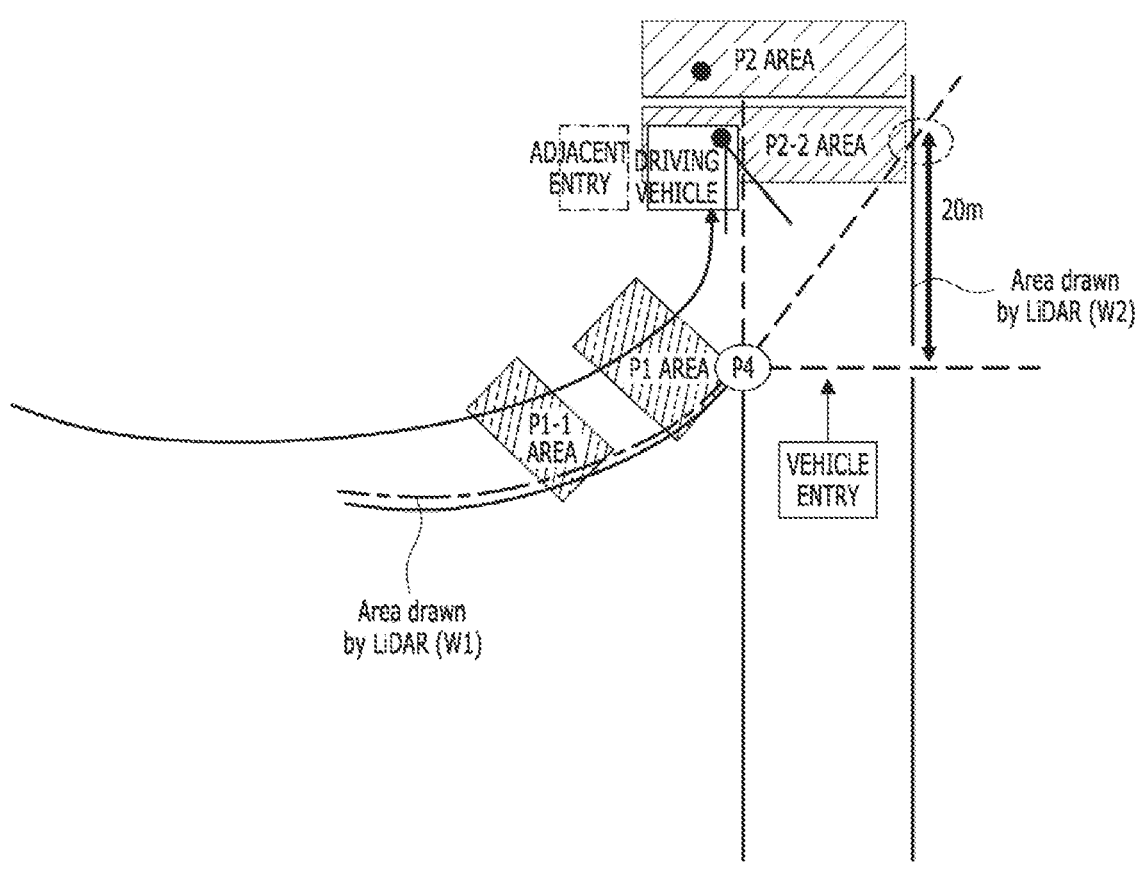

As shown in FIG. 6, the LiDAR controller may check whether a predetermined time has elapsed after being located in the second area (S20), and if the predetermined time has elapsed, the LiDAR controller may transmit a control signal capable of reversely and slowly rotating the view angle of the camera 170 to the camera controller (S22). That is, the LiDAR controller may obtain the boundary point of the W2 area ahead of the P4 point by a predetermined distance, and when the subject vehicle enters the second area, the LiDAR controller may adjust the camera angle again to the original normal fixed view.

In this case, the predetermined distance may be about 20 m, but is not limited thereto, and may be adjusted in consideration of the vehicle speed of the self-driving vehicle, the position of the vehicle, and the like.

When the control signal is provided, the camera controller may adjust the view angle of the camera 170 to an initial view angle of the camera 170 by reversely and slowly rotating the view angle of the camera 170. Thereafter, the normal fixed mode may be reset (S23). Thereafter, the LiDAR controller may check whether a predetermined time has elapsed after being located in the second area (S20), and if the predetermined time has not elapsed, may check whether the vehicle arrives at the corrected 2-2 area (S21).

When it is determined that the LiDAR controller has arrived at the corrected area 2-2 (S21), the LiDAR controller may transmit a reverse control signal to the camera controller (S22). The reverse control signal may be a signal capable of slowly reversing the rotating of the view angle of the camera 170. When the reverse control signal is provided, the camera controller may adjust the view angle of the camera 170 to an initial view angle of the camera 170 by reversely and slowly rotating the view angle of the camera 170.

Thereafter, the mode may be reset to the normal fixed mode (S22).

The LiDAR controller may control the vehicle to be reversely rotated to a normal fixed mode when the vehicle is located in the setting of the second area based on the 40 km or when the vehicle arrives at the setting of the second area.

In addition, the LiDAR controller may control the camera 170 to reversely rotate upon arrival at the existing set position P2 in order to solve a problem in which the LiDAR controller does not return to the normal fixed mode again for a long time due to a signal processing error.

On the other hand, when it is determined that the LiDAR controller does not arrive at the corrected 2-2 area (S21), the LiDAR controller may transmit a control signal capable of setting the rotation adjustment mode of the camera 170 to the camera controller (S19). The camera controller may continuously adjust the image angle of the camera 170 based on a control signal provided in real time from the LiDAR controller.

That is, the LiDAR controller and the camera controller may adjust the view angle of the camera 170 by controlling the rotation angle of the camera 170 according to the position of the vehicle between the 1-1 area and the 2-2 area.

Figure 7:
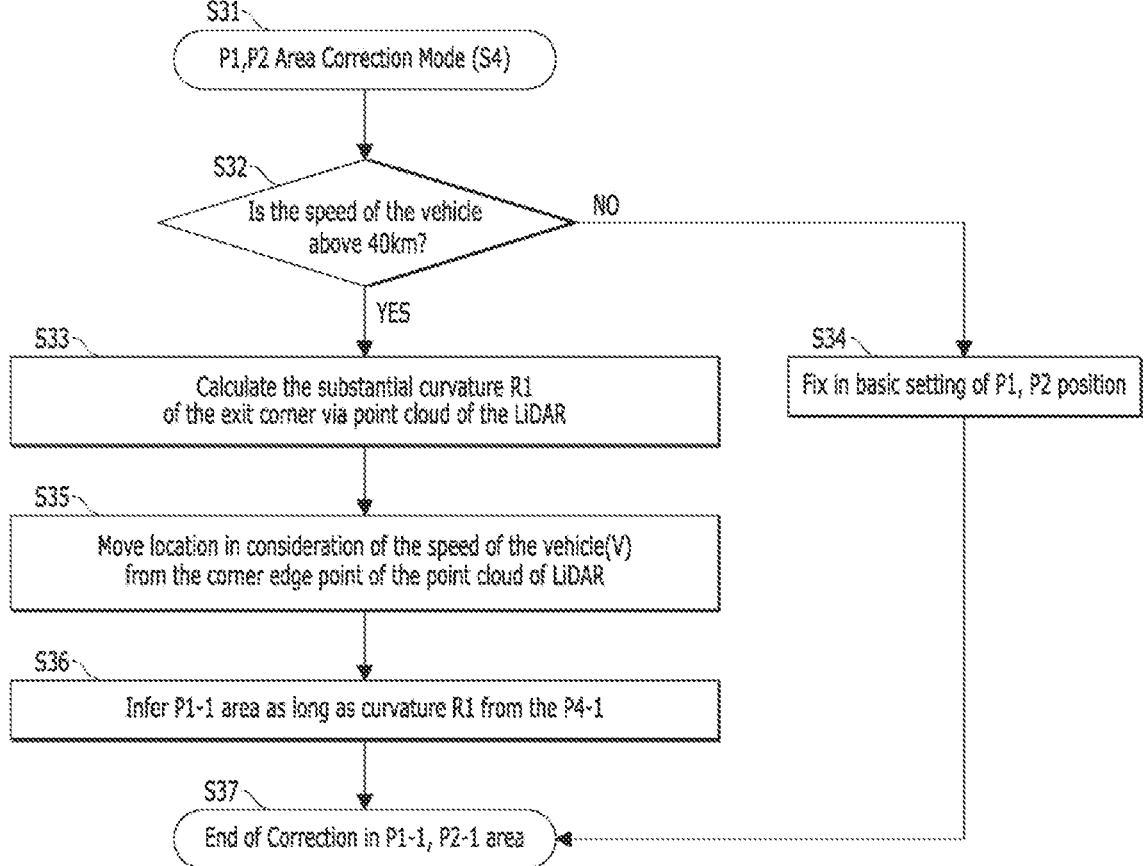
FIGS. 7 and 8 are diagrams illustrating correction of an event area in a vehicle control method according to an embodiment of the present disclosure.
Figure 8:
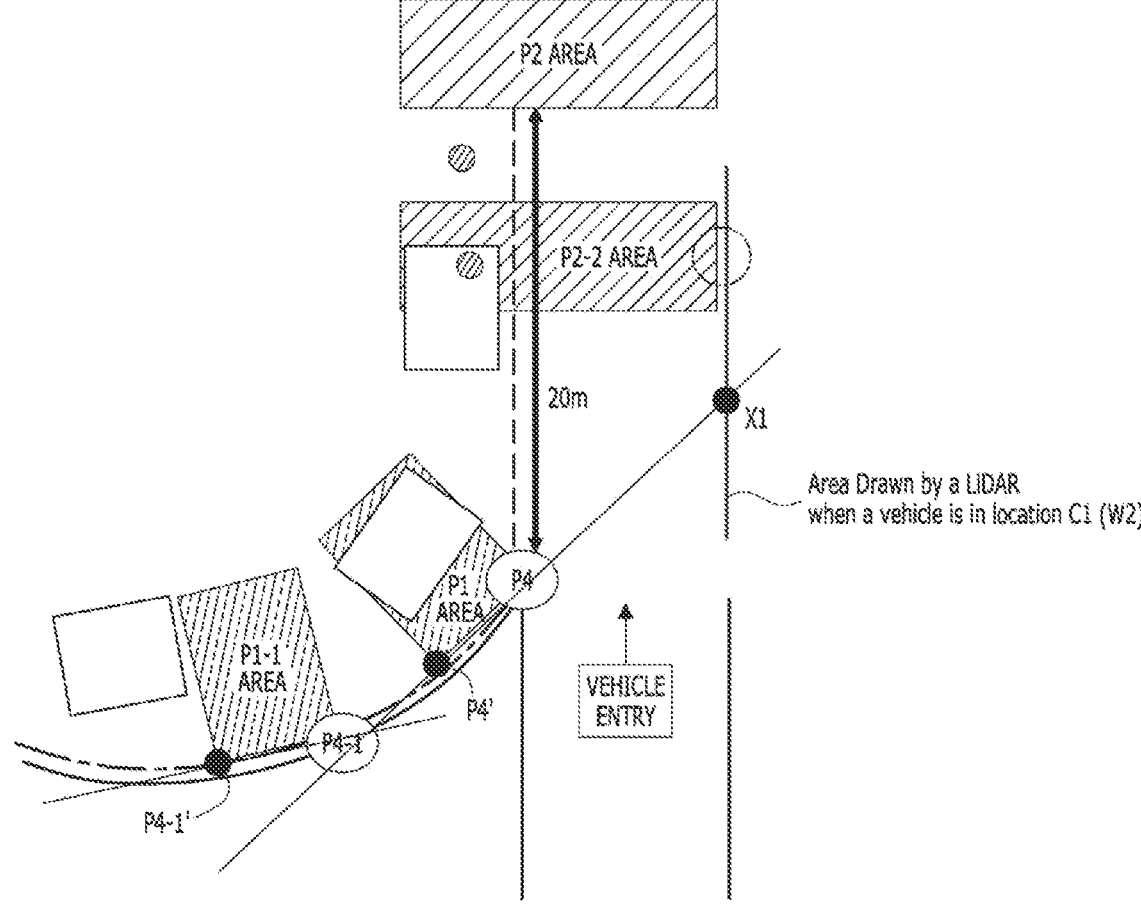

FIGS. 7 and 8 are diagrams illustrating correction of an event area among the vehicle control methods according to an embodiment of the present disclosure.

Referring to FIGS. 7 and 8, the LiDAR controller of embodiments of the present disclosure may pre-register at least one event area in the navigation map or the precise map in consideration of the LiDAR sensor information and the vehicle speed.

For example, the LiDAR controller may check the left and right road boundary lines based on the navigation map or the precise map and may set a location where there is a possibility of an accident at the exit as the event area or the event location through the location check of the self-driving vehicle.

The LiDAR controller may correct the set event area (S31). That is, the LiDAR controller may correct the pre-registered event area in real time in consideration of a vehicle location condition, a vehicle speed, or the like.

The LiDAR controller may analyze the vehicle location condition or the vehicle speed and may fix the area or the position without correcting the first area and the second area (S34) when the analyzed result indicates that the vehicle speed is less than the predetermined cornering speed (S32).

The LiDAR controller may analyze a vehicle location condition or a vehicle speed, and if the analyzed result indicates that the vehicle speed is equal to or greater than a predetermined cornering speed (S32), the LiDAR controller may calculate the relative curvature R1 of the exit corner of the first area using the LiDAR point cloud (S33).

For example, the LiDAR controller may calculate a tangent, rotation, and moving (movement) of the point cloud processing using one of a plurality of algorithms.

As shown in FIG. 8, the LiDAR controller may calculate the tangent by using the P4 point and the P4' point. The LiDAR controller may set a point at which an extension line of a P4 point and a P4' point meet the LiDAR W2 as X1. The LiDAR controller may obtain the curvature R1 using a straight line passing through these three points.

Thereafter, the LiDAR controller may move from the corner edge point of the LiDAR point cloud to the P4-1 point or the P4-1 position in consideration of the vehicle speed V (S35). This is expressed by Equation 1 as follows.

$$\text{Distance}=\text{vehicle speed}(V-40)*H, [P4\text{-}1]=[P4]-\text{dis-}\\ \text{tance} \qquad\qquad\qquad \text{Equation 1:}$$

V may be a vehicle speed of the self-driving vehicle, and 40 may be a predetermined cornering speed. The preset cornering speed may be adjusted in consideration of the surrounding road conditions, etc. H may be the time.

That is, the LiDAR controller may calculate the P4-1 point in consideration of the state of vehicle speed, in which the corner curvature is regarded as a length and the P4 position is set as a fixed point.

Thereafter, the LiDAR controller may be rotated by the curvature R1 at the P4-1 point to derive the P1-1 area (S36). That is, when the P4-1 position coordinates are set, the LiDAR controller may connect a predetermined length or a straight line after the predetermined length.

Accordingly, the LiDAR controller may calculate a P1-1 area by rotating by the R1 curvature.

In addition, the LiDAR controller may calculate the angular difference between the moved P4-1 and the straight line of P4-1', thereby obtaining the rotational curvature.

Thereafter, the LiDAR controller may terminate the correction for the first area or the second area (S37).

Figure 9:
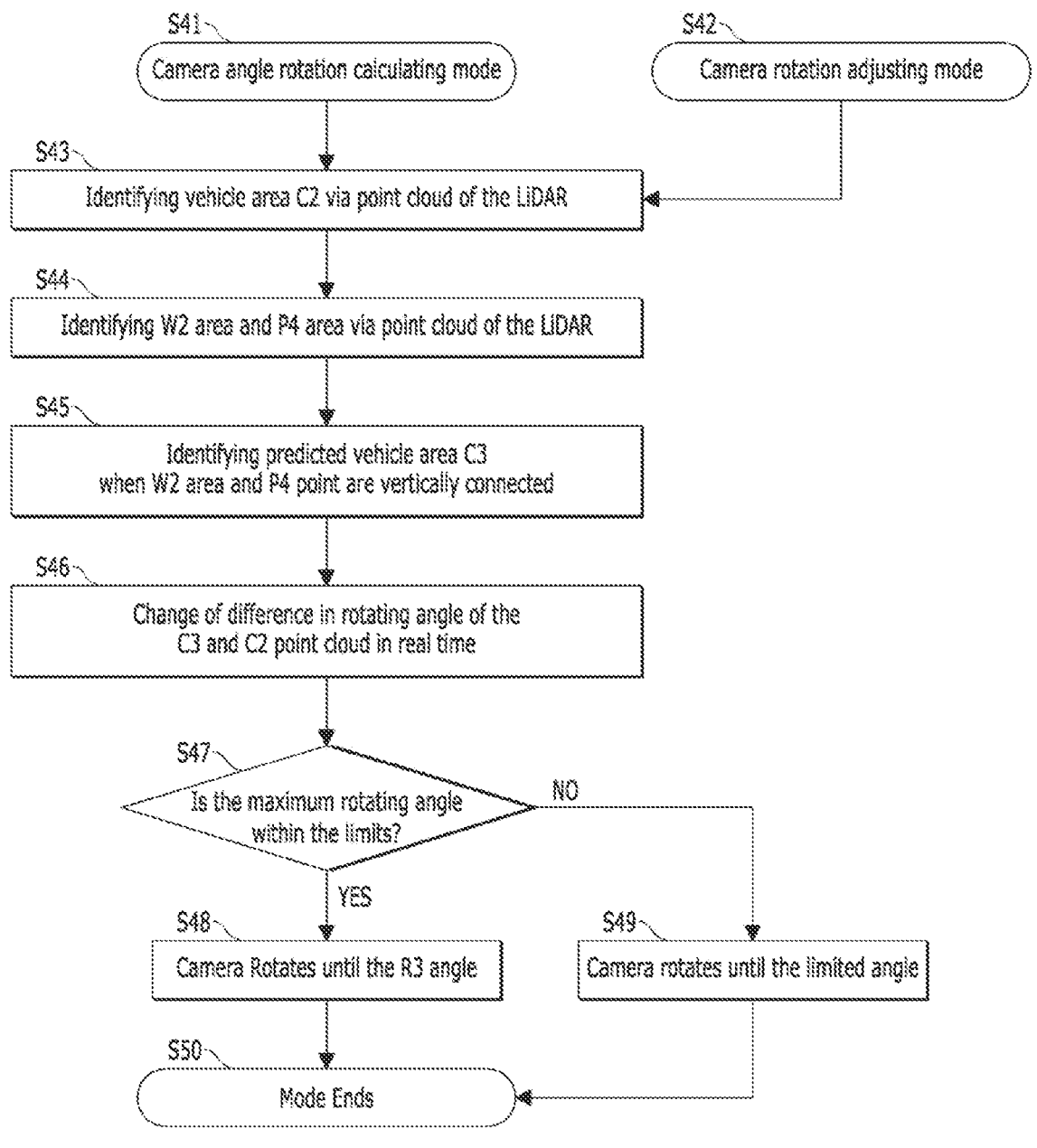
FIGS. 9 and 10 are diagrams illustrating adjustment of a camera in a vehicle control method according to an embodiment of the present disclosure.
Figure 10:
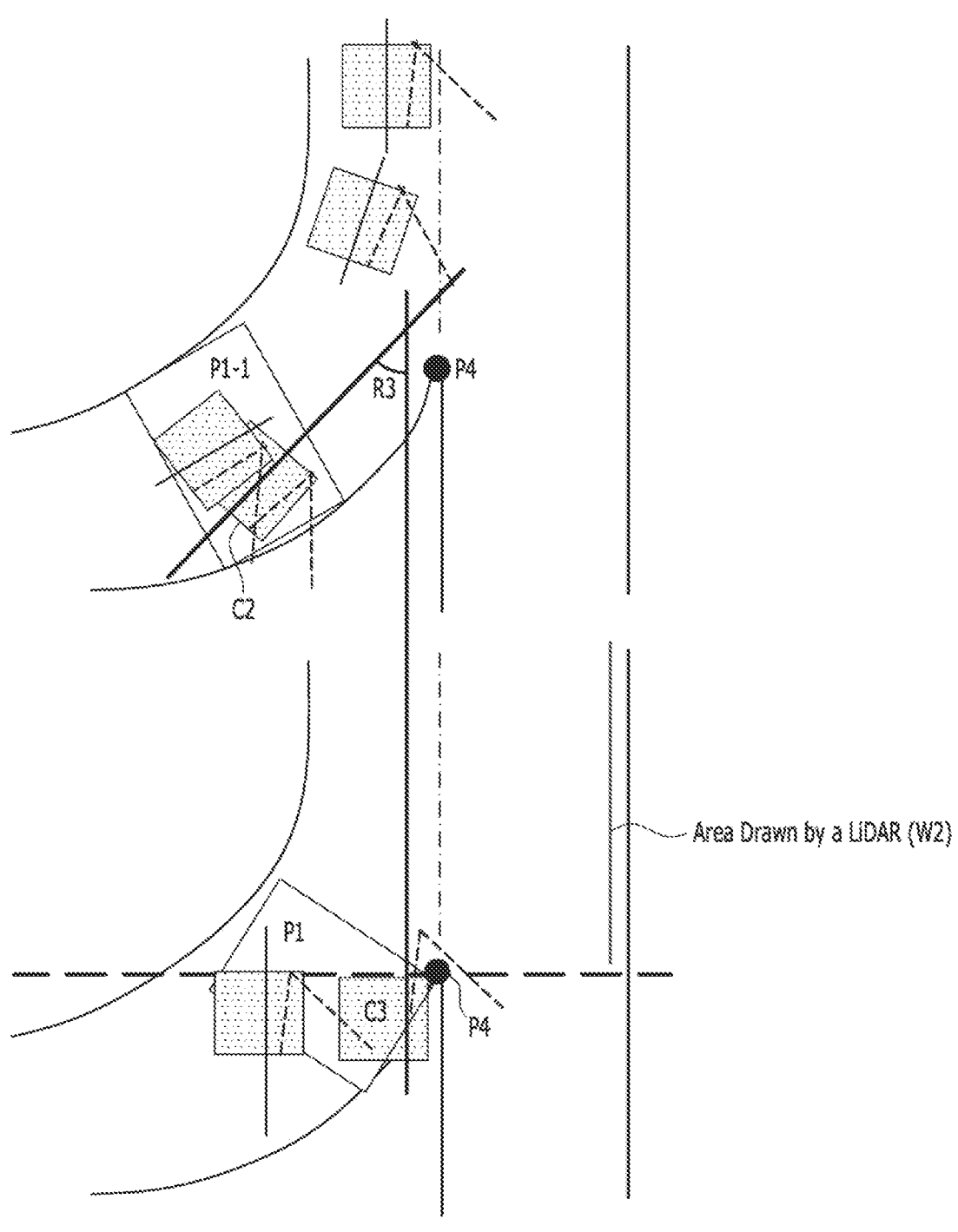

FIGS. 9 and 10 are diagrams illustrating adjustment of a camera in a vehicle control method according to an embodiment of the present disclosure.

Referring to FIGS. 9 and 10, the image angle of the camera 170 may be continuously adjusted based on a control signal provided in real time by the LiDAR controller.

The camera controller may set a camera rotation angle calculation mode based on the control signal provided in real time from the LiDAR controller (S41) or may set a camera rotation adjustment mode (S42).

As shown in FIG. 10, the LiDAR controller may check the location C2 of the vehicle in a LiDAR point cloud (S43). Also, the LiDAR controller may identify the W2 area and the P4 point using the LiDAR point cloud (S44).

Thereafter, when the area W2 and the point P4 are vertically connected, the LiDAR controller may check the predicted vehicle location C3 (S45).

Since a normal line is perpendicular to one plane or a straight line, assuming that direction vectors of a tangent line are (a, b, c), a normal vector (d, e, f) may satisfy Equation 2 below.

$$(a,b,c)*(d,e,f)T=0 \qquad\qquad\qquad \text{Equation 2:}$$

Through this, the first area at the normal position and the 1-1 area that is the actual vehicle area may be extracted, and the angle difference of the tangent line passing through the center point of the actual vehicle situated in the extracted 1-1 area may be set to R3.

Thereafter, the camera controller may change the rotation angle difference R3 between the predicted vehicle location C3 and the actual vehicle location C2 of the point cloud in real time under the control of the LiDAR controller (S46).

Here, since the point cloud is 3D data, the LiDAR controller may add information on the slope of the vehicle to the control signal and provide the control signal to the camera 170. Accordingly, the camera controller may calculate the vertical adjustment degree of the camera based on the control signal through the same logic or algorithm.

The camera controller may calculate an image angle of the camera 170 based on the control signal and may adjust a view angle of the camera 170 based on the calculated image angle of the camera 170.

When the image angle of the camera 170 is within the predetermined maximum rotation limit angle (S47), the camera controller may adjust the view angle of the camera 170 based on the set R3 angle (S48).

On the other hand, if the image angle of the camera 170 is equal to or greater than the predetermined maximum rotation limit angle (S47), the camera controller may adjust the view angle of the camera 170 to the predetermined maximum rotation limit angle (S49).

Thereafter, the LiDAR controller may end the rotation mode (S5o).

Meanwhile, a recording medium recorded with a program for executing the vehicle control method acquires vehicle surrounding information and vehicle information by using LiDAR data with respect to a blind spot area occurring in a position of a specific pattern, controls a camera to rotate so as to adjust a view angle of the camera based on a vehicle speed and the vehicle surrounding information, and records a program implementing a function of the vehicle control method capable of displaying an image with respect to a blind spot area required for a driver, and a computer can read the recording medium.

The computer-readable recording medium may include any data storage device that can store data which can be thereafter read by a computer system. Examples of the computer-readable recording medium include a ROM, a RAM, a CD-ROM, a magnetic tape, a floppy disk, and an optical data storage device. In addition, the computer-readable recording medium may be distributed over network-connected computer systems so that the computer-readable code is stored and executed in a distributive manner. In addition, functional programs, codes, and code segments for implementing the vehicle control method may easily be inferred by programmers skilled in the art to which the present disclosure pertains.

The above-described various embodiments may be combined with each other unless they are contrary to each other without departing from the embodiments of the present disclosure. In addition, when the elements of any of the above-described various embodiments are not described in detail, the description of the elements having the same reference numerals of other embodiments may be applied.

Although the above description has been focused on the embodiments, this is merely an example, and the present disclosure is not limited thereto, and it will be understood by those skilled in the art that various modifications and applications that are not illustrated above may be made without departing from the essential characteristics of the present embodiments. For example, each element specifically shown in the embodiments may be modified and implemented. Further, the differences related to the modifications and applications should be interpreted as being included in the scope of the present disclosure defined in the appended claims.

What is claimed is:

1. A vehicle control device, comprising:
a LiDAR sensor mounted in a vehicle and configured to sense an environment surrounding the vehicle;
an audio video navigation (AVN) device mounted in the vehicle and configured to generate an event signal in response to an event area being sensed during driving of the vehicle; and
a processor configured to acquire information on the environment surrounding the vehicle based on LiDAR data obtained by the LiDAR sensor and the event signal and to control a view angle of a camera mounted in the vehicle in response to the information on the environment, wherein the processor is further configured to adjust the event area based on whether a speed of the vehicle is equal to or greater than a predetermined cornering speed.

2. The device of claim 1, wherein the camera is configured to provide blind spot image data to the AVN device, the blind spot image data photographed while rotating under the control of the processor.

3. The device of claim 2, further comprising an internal display device configured to display the blind spot image data provided from the camera.

4. The device of claim 1, wherein the AVN device comprises a display device configured to display blind spot image data provided from the camera.

5. The device of claim 1, wherein the processor comprises:
a first controller comprising at least one algorithm to obtain the information on the environment surrounding the vehicle based on the LiDAR data and the event signal; and
a second controller electrically connected to the camera, and configured to receive a first rotation angle control signal or a second rotation angle control signal from the first controller, and to adjust the view angle of the camera based on the first rotation angle control signal or the second rotation angle control signal.

6. The device of claim 5, wherein the first controller is configured to calculate initial information of the vehicle using the at least one algorithm, and to acquire the information on the environment surrounding the vehicle by collecting vehicle speed information of the vehicle from the initial information of the vehicle.

7. The device of claim 5, wherein the processor is configured to acquire a data set by using the LiDAR data, and generate an event flag by using the data set.

8. The device of claim 5, wherein the event area includes a first area which is an entry area of the event area and a second area which is an exit area of the event area.

9. The device of claim 8, wherein the first controller is configured to adjust the event area based on a result from analyzing a location condition of the vehicle located in the event area and the speed of the vehicle.

10. A vehicle control device, comprising:
a LiDAR sensor mounted in a vehicle and configured to sense an environment surrounding the vehicle;
an audio video navigation (AVN) device mounted in the vehicle and configured to generate an event signal in response to an event area being sensed during driving of the vehicle; and
a processor configured to acquire information on the environment surrounding the vehicle based on LiDAR data obtained by the LiDAR sensor and the event signal and to control a view angle of a camera mounted in the vehicle in response to the information on the environment, wherein the processor is further configured to adjust the event area based on a result from analyzing a location condition of the vehicle located in the event area and a speed of the vehicle, to maintain the event area when the speed of the vehicle is within a predetermined cornering speed and the location condition is satisfied, and to adjust the event area when the speed of the vehicle is equal to or greater than the predetermined cornering speed and the location condition is satisfied.

11. A control method for a vehicle control device, the control method comprising:
sensing an environment surrounding a vehicle using a LiDAR sensor mounted in the vehicle;
generating an event signal in response to an event area being sensed while the vehicle is driven;
adjusting the event area based on whether a speed of the vehicle is equal to or greater than a predetermined cornering speed;
acquiring information on the environment surrounding the vehicle based on LiDAR data sensed by the LiDAR sensor and the event signal under control of a processor mounted in the vehicle; and
controlling a view angle of a camera mounted in the vehicle in response to the information on the environment.

12. The control method of claim 11, wherein acquiring the information on the environment surrounding the vehicle comprises:
capturing blind spot (BS) image data by the camera being rotated under control of the processor; and
outputting the captured BS image data.

13. The control method of claim 12, wherein acquiring the information on the environment surrounding the vehicle further comprises displaying the BS image data.

14. The control method of claim 11, wherein acquiring the information on the environment surrounding the vehicle comprises acquiring the information on the environment surrounding the vehicle based on the LiDAR data and the event signal.

15. The control method of claim 14, wherein the processor comprises a first controller and a second controller, and wherein controlling the view angle of the camera comprises:

receiving a first rotation angle control signal or a second rotation angle control signal from the first controller under the control of the second controller; and adjusting the view angle of the camera based on the first rotation angle control signal or the second rotation angle control signal.

16. The control method of claim 14, wherein acquiring the information on the environment surrounding the vehicle comprises:

calculating initial information of the vehicle; and acquiring the information on the environment by collecting vehicle speed information of the vehicle in the initial information of the vehicle.

17. The control method of claim 14, wherein generating the event signal comprises acquiring a data set by using the LiDAR data under the control of the processor and generating an event flag by using the data set.

18

18. The control method of claim 14, wherein the event area comprises a first area that is an entry area of the event area and a second area that is an exit area of the event area.

19. The control method of claim 18, wherein acquiring the information on the environment surrounding the vehicle comprises adjusting the event area based on a result from analyzing a location condition of the vehicle located in the event area and the speed of the vehicle.

20. The control method of claim 19, wherein adjusting the event area comprises:

maintaining the event area in response to the speed of the vehicle being within a predetermined cornering speed and the location condition being satisfied; and adjusting the event area in response to the speed of the vehicle being equal to or greater than the predetermined cornering speed and the location condition being satisfied.

* * * * *